UNITED STATES PATENT OFFICE.

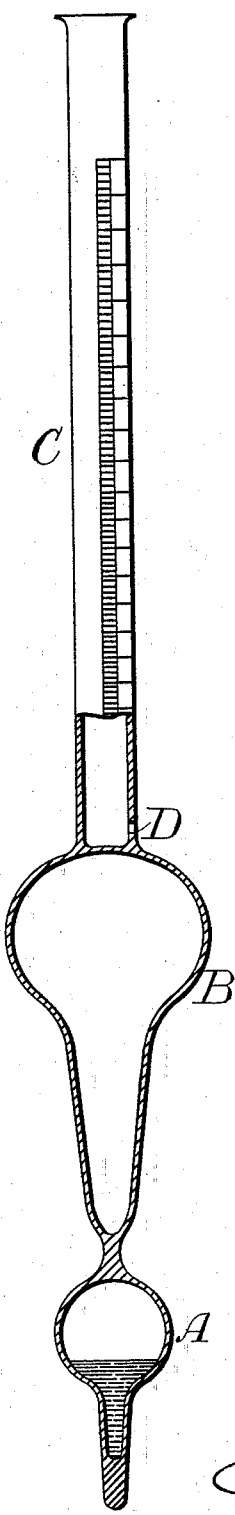

HENRY SHEEHY KEATING, OF LONDON, ENGLAND.

HYDROMETER.

SPECIFICATION forming part of Letters Patent No. 524,944, dated August 21, 1894.

Application filed April 24, 1894. Serial No. 508,843. (No model.)

*To all whom it may concern:*

Be it known that I, HENRY SHEEHY KEATING, a citizen of England, residing at No. 22 Prince's Gate, in the city of London, England, have invented a new and useful Improvement in Hydrometers, Saccharometers, and such Like Instruments, of which the following is a specification.

My invention relates to hydrometers, saccharometers and such like instruments of the kind in which a bulb loaded, usually with mercury, is immersed in liquid, the gravity of which is indicated by the depth to which the graduated stem of the instrument is immersed. As the stem requires to be of some strength for use, it displaces for every degree of its immersion a considerable volume of liquid, and consequently the scale is not so delicate as could be desired. According to my invention I make the stem as a tube open at both ends or having lateral openings at the top and the bottom so that the liquid has free access to its interior, and the displacement of liquid is only that due to the volume of the wall of the tube which is comparatively small. I can thus consistently with a strong stem, get a scale of greater delicacy than when the stem is solid or a tube closed against access of the liquid.

The accompanying drawing is a vertical section of a hydrometer according to my invention.

The bulb A is charged with a suitable load of mercury, the air bulb B is closed as usual, the graduated stem C instead of being solid is a tube open at the top and having at its bottom a lateral orifice D by which liquid can freely enter the tube when the hydrometer is immersed.

Having thus described the nature of this invention and the best means I know for carrying the same into practical effect, I claim—

A hydrometer having a stem made tubular instead of solid, with openings at each end, substantially as and for the purpose set forth.

In testimony whereof I have signed my name to this specification, in the presence of two subscribing witnesses, this 11th day of April, A. D. 1894.

HENRY SHEEHY KEATING.

Witnesses:
W. M. HARRIS,
T. F. BARNES.